Figure 1:
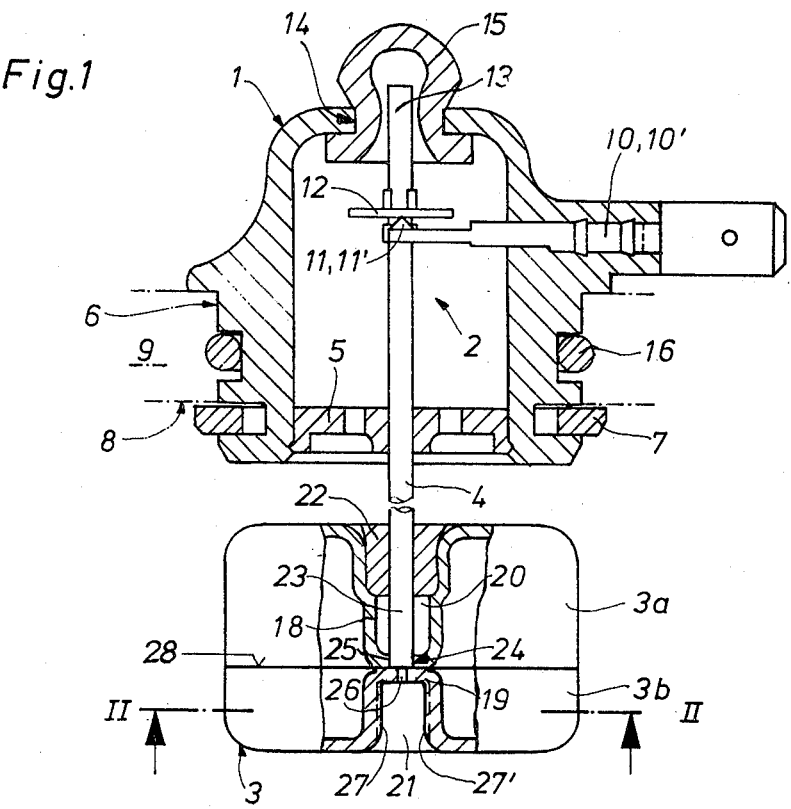

United States Patent [19]
Skrabs

[11] 3,915,001
[45] Oct. 28, 1975

[54] FLOAT FOR A LEVEL INDICATOR OF A FLUID RESERVOIR

[75] Inventor: Alfred Skrabs, Sitterswald, Germany

[73] Assignee: Deutsche Bendix, Saarbruecken, Germany

[22] Filed: Oct. 3, 1974

[21] Appl. No.: 511,849

[30] Foreign Application Priority Data
Oct. 9, 1973  Germany.......................... 7336371

[52] U.S. Cl. ............................................. 73/322.5
[51] Int. Cl.² ........................................ G01F 23/06
[58] Field of Search .......... 73/322.5, 322, 305, 309, 73/319, 444, 448; 116/118 R

[56] References Cited
UNITED STATES PATENTS
2,415,692  2/1947  Huston........................... 73/322.5 X
3,049,010  8/1962  Holderith.......................... 73/322.5

Primary Examiner—Richard C. Queisser
Assistant Examiner—Joseph W. Roskos
Attorney, Agent, or Firm—Leo H. McCormick, Jr. William N. Antonis

[57] ABSTRACT

The invention relates to a float for a level indicator of a fluid reservoir. The float comprises an annular body made of two cup-like synthetic plastics members welded together. The body comprises an inner cavity consisting in two blind holes separated by a radial wall and having their blind ends of equal diameter. The upper hole is stepped to receive an annular plug traversed by a float rod engaged in a central bore provided in the radial wall. The inner wall of the body is provided with radial projections located in the second blind hole.

3 Claims, 2 Drawing Figures

FLOAT FOR A LEVEL INDICATOR OF A FLUID RESERVOIR

The invention relates to a float for a level indicator of a fluid reservoir by way of example for hydraulic motor vehicle brakes. They are already known floats comprising an annular body made of synthetic plastics and of which the inner wall is substantially cylindrical and has in its central zone a radial abutment wall which separates the interior into two blind holes, the upper, first blind hole being closed by a resilient annular plug traversed by a float rod, of which one end portion engages in a central stepped bore penetrating the abutment wall.

In such a float, the fact that the two blind holes are substantially identical in diameter may cause the resilient annular plug to be inserted in the wrong hole, so that the float rod is not retained by the abutment wall. Clearly, confusion between the holes could be avoided by providing them with appreciably different diameters. This would enable them to be told apart, but might have other disadvantages. In effect, under same circumstances a relatively high pressure may arise inside the fluid reservoir. In a brake fluid reservoir, the pressure may amount to 40 p.s.i., for example when the brake system is first filled by the vehicle manufacturer. If the indicator switch operated by the float is in the fluid reservoir while it is filled, the float body also is exposed to the high pressure. To withstand the high pressure on the body, the end walls of the two blind holes must be able to react in abutting on one another, but a slight difference in diameter may present this, so that the central part of the float is compressed and one wall is inverted over the other.

An object of the present invention is to provide a float of the type described which can withstand a relatively high external pressure, for example, 60 p.s.i., and which ensures that the float rod cannot be wrongly installed.

To this end, according to the invention, the second blind hole has substantially the same diameter as the first blind hole, but the diameter is partly reduced by projections, such as bulges, lumps or the like, provided inside the second blind hole. This arrangement ensures secure abutment of both end walls of the blind holes, and also prevents the resilient plug and therefore the float rod from being assembled wrongly. The projections inside the second blind hole make it impossible to insert the plug. Advantageously, the first blind hole, is a stepped hole into whose outer, wider portion the resilient plug is inserted. For the reasons given, the outer, larger portion can be only slightly larger, large enough to form a stop for the plug at the transition to the inner portion. The projections in the second blind hole, which may take any form which precludes incorrect installation of the plug.

Figure 2:
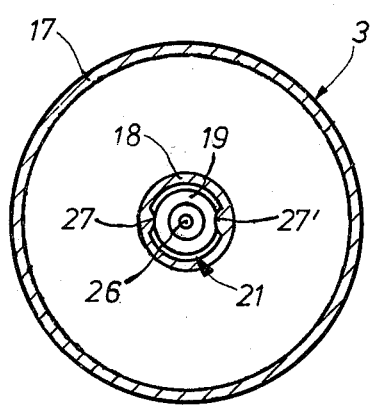

An embodiment of the invention illustrated in the drawings will now be described in detail by way of example. In the drawings:

FIG. 1 shows a switch for a level indicator of a fluid reservoir of a hydraulic brake system, partly in section, and FIG. 2 represents a section on a line II—II in FIG. 1.

A fluid reservoir for a hydraulic brake system in a motor vehicle has a cap 1, below which there is a switch 2. The switch 2 comprises a float 3 guided by means of a float rod 4 in an insert 5 in the cap 1. The float 3 moves up and down with the float rod 4 according to the fluid level, due to its buoyancy. The cap 1 is inserted in an opening 6, where it is held by a ring 7 which bears on the underside 8 of the roof 9 of the fluid reservoir. The switch 2 also includes two plug connectors 10, 10' which project next to one another out of the side of the cap 1, are extended inside the cap 1 and are provided with contact parts 11, 11'. Between the contact parts runs the float rod 4, on to which a contact plate 12 is threaded above the contact parts, the contact plate being substantially prevented. by deformation of the material above and below it from moving axially along the rod 4. The upper end portion 13 of the float rod 4 extends through an opening 14 in the cap 1. A bell-shaped resilient plug 15 is inserted into the opening 14 from below. An O-ring 16, shown unstressed in FIG. 1, provides a seal within the opening 6.

The float 3 comprises an annular body made of two cup-like synthetic plastics members 3a, 3b welded together in its central zone 28. The outer wall 17 of the body is right cylindrical whereas the inner wall 18 defines a cylindrical cavity divided into two blind holes 20, 21 by a double radial abutment wall 19 located in the central zone 28 of the body. The upper hole 20 is a stepped hole, of which the outer and larger diameter portions receives a resilient annular plug 22 holding the float rod 4. One end portion 23 of the rod is received into a central stepped bore 24 provided in the abutment wall 19. The larger step 25 of the bore 24 forms a bearing for the lower end portion 23 of the float rod 4, whereas the step 26 of the hole 24 acts as a ventilating aperture for the hole 20.

The blind end of hole 20 has substantially the same diameter as the second blind hole 21. However, the inner wall 18 is provided with axially extending projections 27, 27' located inside the second blind hole 21 and which may alternatively be in the form of lumps. This partial obstruction of the hole 21 makes it impossible to insert the plug 22 in this hole. Incorrect installation of the plug is thereby prevented, and the end portion 23 of the float rod 4 abuts on the abutment wall 19 as intended.

I claim

1. A float for a level indicator of a reservoir, said float comprising an annular body made of synthetic plastics and having an inner wall defining a substantially cylindrical cavity, said body having a radial abutment wall dividing the interior of the cavity into two blind holes having blind ends substantially of equal diameter, the upper, first blind hole being closed by a resilient annular plug traversed by a float rod, said radial abutment wall being provided with a central stepped bore receiving the end portion of the float rod, said inner wall being provided with radial projections located inside said second blind hole.

2. A float as claimed in claim 1, wherein the first blind hole is stepped to provide an outer portion of larger diameter receiving the resilient plug.

3. A float as claimed in claim 1 characterized in that the float is composed of two cup-like members of synthetic plastics, welded together in the vicinity of the radial abutment wall.

* * * * *